United States Patent [19]
Gans et al.

[11] Patent Number: 4,747,621
[45] Date of Patent: May 31, 1988

[54] AQUATIC VACUUM HOSE SWIVEL CUFF

[75] Inventors: Leo Gans, Teaneck; Ronald Presinzano, Andover, both of N.J.

[73] Assignee: Action Technology, Rockaway, N.J.

[21] Appl. No.: 932,726

[22] Filed: Nov. 19, 1986

[51] Int. Cl.[4] .............................................. F16L 21/00
[52] U.S. Cl. ........................................ 285/7; 285/275; 285/423; 285/903; 285/921
[58] Field of Search ................... 285/7, 275, 280, 903, 285/921, 423

[56] References Cited

U.S. PATENT DOCUMENTS

| | | | |
|---|---|---|---|
| 3,727,949 | 4/1973 | Kleykamp | 285/7 |
| 3,864,784 | 2/1975 | Kilstrom | 285/7 X |
| 3,899,198 | 8/1975 | Maroschak | 285/903 X |
| 4,368,904 | 1/1983 | Lonz | 285/903 X |
| 4,542,922 | 9/1985 | Grossauer | 285/903 X |
| 4,558,889 | 12/1985 | Gans | 285/7 |
| 4,625,998 | 12/1986 | Dranct et al. | 285/7 |

FOREIGN PATENT DOCUMENTS 2123106 1/1984 United Kingdom ........... 285/903 X

Primary Examiner—Dave W. Arola
Attorney, Agent, or Firm—Morgan & Finnegan

[57] ABSTRACT

An aquatic vacuum hose swivel cuff coupling comprises, in combination, a blow-molded vacuum hose and a molded swivel cuff. The hose includes one end which terminates as a corrugated end portion having circumferential grooves therein. The swivel cuff component has a seating portion for receiving the corrugated end portion of the hose and at least one annular ring adapted to fit within the circumferential grooves of the hose, the annular ring being provided about the hose entrance to the seating portion of the cuff. The corrugated end portion of the hose is maintained within the seating portion of the cuff by the annular ring being disposed within the circumferential grooves whereby the hose may be swivelably rotated within the cuff. The corrugated end portion of the hose is extruded with the continuous extrusion blow-molded hose thereby eliminating the need to weld components such as seals.

3 Claims, 3 Drawing Sheets

AQUATIC VACUUM HOSE SWIVEL CUFF

BACKGROUND OF THE INVENTION

The invention pertains to vacuum hose swivel cuffs. More particularly, the invention pertains to vacuum hose swivel cuffs for use in swimming pools.

It is known to provide a swivel cuff fitting for effecting a swivelable coupling between a stretch of vacuum hose and a wand or tank of a vacuum cleaner. Vacuum hose swivel cuff couplings typically comprise a combination of a swivel cuff and a hose end wherein the hose end may be swivelably secured within the cuff through the use of circular seals secured to the hose end. The seals thereafter rotate within grooves provided within the cuff to effect swivelable sealing.

Examples of swivel fittings such as may be utilized with vacuum cleaners are illustrated in U.S. Pat. No. 4,345,805 to Finley et al, (Aug. 24, 1982). Finley illustrates a cuff fitting securing a vacuum hose wherein a corrugated hose is swivelably and pneumatically sealed within the fitting through the use of a sealing surface on the cuff in engagement with a flexible lip at the end portion of the vacuum hose. A ring engageable within the cuff compresses the end portion of the corrugated hose to bias the flexible lip into engagement with the sealing surface of the cuff.

Further references illustrating alternate hose connections include U.S. Pat. Nos. 4,099,744 (Kutnyak et al, 1978), 3,727,949 (KleyKamp et al, 1973), 3,926,222 (Shroy et al, 1975), 3,929,359 (Schmunk et al, 1975) and 3,864,784 (Kilstrom et al, 1975).

Particularly, U.S. Pat. No. 4,099,744 to Kutnyak et al discloses a snap-in swivel end fitting hose wherein each section of hose has a suitable cuff on each end. The hose end fitting is a one-piece molded member having a locking seat and a tapered or a threaded end section. The tapered end section is adapted to be forced into the cuff so as to spread the snap lock on the cuff. U.S. Pat. Nos. 3,929,359 and 3,926,222, on the other hand, utilize cleat-like protuberances to join lengths of hose or pipe. Kleykamp (U.S. Pat. No. 3,727,949) teaches the use of hose convolutes to effect substantially airtight sealing.

Although vacuum hose swivel fittings such as disclosed by Finley et al (U.S. Pat. No. 4,345,805) provide effective, swivelable-sealing coupling between the vacuum hose and wand or tank members, such vacuum hose swivel fittings and hose combinations rely extensively upon the use of welding techniques to attach seal rings to the corrugated lengths of hose end whereby the seal rings may be disposed within grooves provided within the cuff member to effect swivelable sealing connection therebetween. The use of such welding techniques, however, provides a failure Point which may, through time, result in a failure of the swivel fitting.

Furthermore, the welding of hose components is an expensive process compared to extrusion blow-molding techniques currently known for the fabrication of vacuum hoses. Such blow-molding fabrication techniques provide lightweight, low cost, crush resistant vacuum hoses which have heretofore not been effectively utilized in combination with aquatic vacuum hose swivel cuff technology. Indeed, all known swivel cuff applications in the pool hose industry have heretofore been provided exclusively on spiral wound hose and have not effectively utilized continuous extrusion blow-molding techniques.

U.S. Pat. No. 4,558,889 to Gans discloses an aquatic vacuum hose swivel cuff coupling having a blow-molded hose with a cylindrical end portion and a swivel cuff adapted to fit thereon. While this arrangement represents a substantial improvement over prior configurations, by providing a special blown end on the hose, the swivel cuff does not engage the blow-molded hose portion directly.

It is therefore an object of the invention to provide a blow-molded hose and swivel cuff coupling for aquatic use.

It is a further object of the invention to provide a swivel cuff fitting for a blow-molded vacuum hose which eliminates the need for welding seals onto the extruded hose end yet retains swivelable engagement between the cuff and the vacuum hose end.

It is a still further object of the invention to provide a vacuum hose swivel cuff coupling which is lightweight, crush resistant and of relatively low cost.

It is a still further object of the invention to provide a vacuum hose swivel cuff which has a reduced incidence of failure.

SUMMARY OF THE INVENTION

These and other objects of the invention are met by providing a vacuum hose and swivel cuff combination including a blow-molded hose which has at least one end which terminates as a corrugated end portion having circumferential grooves therein and a cuff which has a seating portion for receiving the cylindrical end portion of the hose and a first annular ring adapted to fit within the circumferential grooves of the hose, said first annular ring being provided about the hose entrance to the seating portion of the cuff. The corrugated end portion of the hose is maintained within the seating portion by the first annular ring being disposed within the circumferential grooves of the hose. The hose portion may thereby be swivelably rotated within the cuff. The corrugated hose end is extruded with the remainder of the continuous extrusion blow-molded hose thereby eliminating the need to weld sealing portions. The invention, being contemplated for use in swimming pool applications, is not dependent upon airtight sealing to be operative. Thus, by eliminating the need to affix, such as by welding, a sealing mating portion to the hose end for effecting the seal, the entire hose may be continuously extruded by a blow-molding technique and welded failure points eliminated. Additionally, the cuff is adapted to engage the hose directly without the need of a special blown end.

BRIEF DESCRIPTION OF THE DRAWINGS

The invention will be described more fully below by reference to the following drawings, in which.

DETAILED DESCRIPTION OF THE DRAWINGS

The disclosures herein represent improvements of, and improved additions to, the embodiments taught in U.S. Pat. No. 4,558,889 to Gans, the disclosure of which is incorporated herein by reference.

Figure 1:
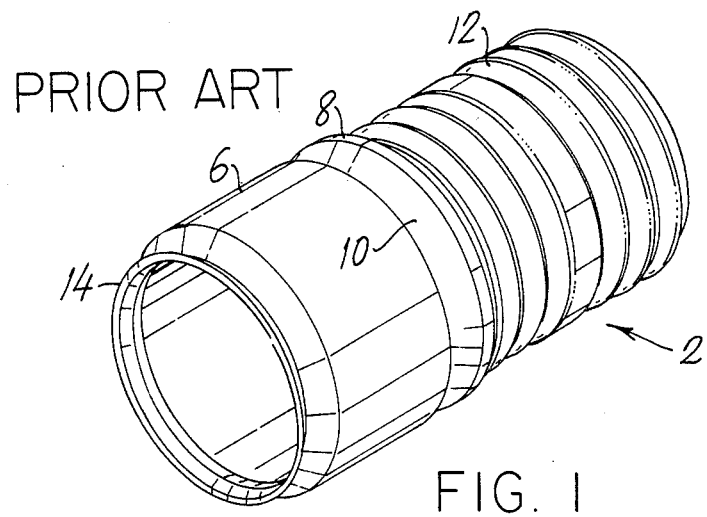
FIG. 1 is a perspective drawing of an extruded hose end such as a swimming pool vacuum hose end from the prior art.

FIG. 1, from U.S. Pat. No. 4,558,889 to Gans, illustrates an end of a corrugated length of hose such as may be produced by an extrusion blow-molding process. More particularly, FIG. 1 illustrates a blow-molded swimming pool vacuum hose end having a cylindrical end portion 6 and ring 8. Cylindrical end portion 6 and ring 8 may be extruded with the remainder 12 of the continuous extrusion blow-molded swimming pool vacuum hose 2. Hose ring 8 is provided adjacent to the cylindrical end portion 6. The ring 8 is spaced a distance from cylindrical end portion 6 whereby a circumferential groove 10 is provided therebetween.

In the embodiment of FIG. 1, a circular sealing lip 14 may be provided about the end of cylindrical end portion 6. As with the remaining components of the hose end of FIG. 1, lip 14 may be continuously extruded therewith.

It is contemplated that the hose of FIG. 1 be fabricated of lightweight flexible plastic such as by the above mentioned widely known blow-mold process. Such blow-molded hose provides a significant weight advantage over previously applied spiral wound hose.

Although the cylindrical end portion 6 is provided of the same flexible plastic as the remainder of the hose of FIG. 1, the non-corrugated nature of this portion imparts a degree of rigidity and strength to this section of the hose end in contrast with the substantially more flexible convoluted portion of the remainder 12 of the hose of FIG. 1.

Figure 2:
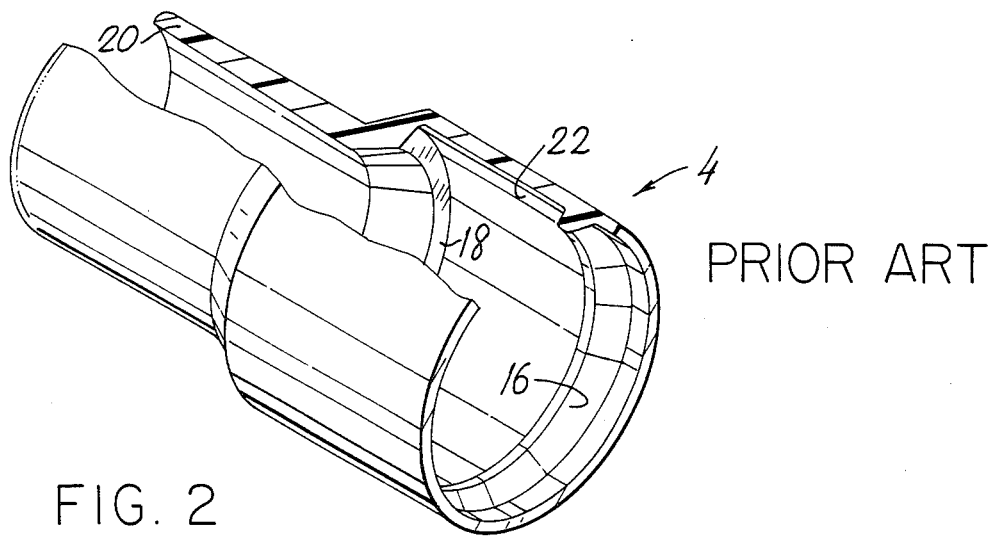
FIG. 2 is a partially cut-away perspective drawing of a swivel cuff such as may provide swivelable coupling in combination with the vacuum hose of FIG. 1.

FIG. 2, also from the Gans patent, illustrates a swivel cuff 4 for use in a vacuum hose swivel cuff in combination with the hose of FIG. 1. The swivel cuff of FIG. 2 may be molded of plastic or rubber and includes a female end 20 for fitting over, e.g., an underwater vacuum head or brush.

The hose receiving end of the cuff 4 includes an annular ring 16 which traverses the inner circumference of a portion of the cuff 4 of FIG. 2 about the hose entrance thereto. A second annular ring 18 may be provided about the inner circumference of the cuff of FIG. 2 at a distance from the first annular ring 16 and at the junction between the receiving end of the cuff 4 and the female fitting portion 20 of swivel cuff of FIG. 2 A seating portion 22 is defined between the first annular ring 16 and the second annular ring 18 for receiving the cylindrical end portion 6 of the hose 2 of FIG. 1.

Figure 3:
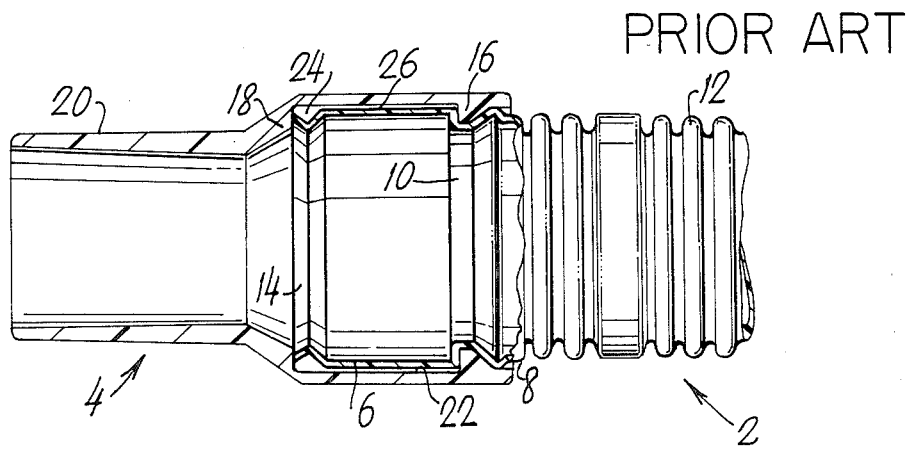
FIG. 3 is a partial cross-sectional view of the hose of FIG. 1 in seating connection with the swivel cuff of FIG. 2.

FIG. 3, from the Gans patent, illustrates the vacuum hose of FIG. 1 in swivelable seating engagement within the swivel cuff 4 of FIG. 2. Particularly, cylindrical end portion 6 of vacuum hose 2 is shown in seating engagement within the seating portion 22 of the cuff 4.

The inner diameter of the first annular ring 16 is less than the outer diameter of the cylindrical end portion 6 of vacuum hose 2. Thus, to dispose the cylindrical hose end within the swivel cuff 4, it is necessary to collapse, e.g., by "pinching", the cylindrical hose end 6 to pass the same within the first annular ring 16 as cylindrical hose end 6 is moved into place within the seating portion 22 of the swivel cuff 4.

The first annular ring 16 of the swivel cuff 4 is adapted to fit within the groove 10 provided around the vacuum hose 2 between the cylindrical end portion 6 and hose ring 8. Thus, while the cylindrical hose end 6 is seated within seating portion 22 of the swivel cuff 4, the hose end is retained in place by the first annular ring 16. However, since the annular ring 16 is adapted to fit within the circumferential groove 10 on the hose end, a swivelable connection is provided therebetween whereby the hose 2 is able to rotate or swivel freely within the cuff 4 while the hose is retained in place.

First annular ring 16 may also serve to provide rigidity to a relatively thin-walled swivel cuff 4 at the point where the cuff 4 mates with the blow-molded hose 2.

A passageway 26 is illustrated between the hose end portion 2 and the swivel cuff portion 4 within the engagement area illustrated in FIG. 3. This illustrates the principle that in an underwater environment seepage between the hose 2 and the cuff 4 will not adversely affect water suction through the hose 2 during vacuum operation. Since the intended use is in an aquatic environment such as a swimming pool, it is thus not necessary that an air-tight seal be provided between the hose end 2 and the swivel cuff 4 for the swivel cuff coupling to be operable. Since a water-tight seal is not required between the hose 2 and the cuff 4, cylindrical hose end 6 and hose ring 8 may be easily continuously extruded with the remainder 12 of the blow molded hose 2 without regard to providing a welded seal on the hose to effect a seal between the hose 2 and the cuff 4.

By eliminating the need to provide welded seals to the hose, a potential weld failure point is eliminated. The lack of a sealing engagement within the swivel cuff further allows easy swiveling of the hose within the cuff since there is reduced friction between the hose and the cuff.

Figure 4:
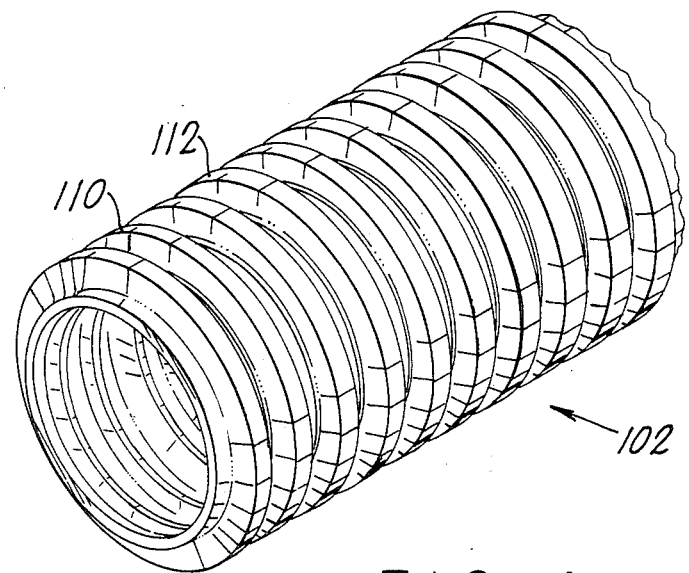
FIG. 4 is a perspective drawing of an extruded corrugated hose end such as a swimming pool vacuum hose end in accordance with the instant invention.
Figure 5:
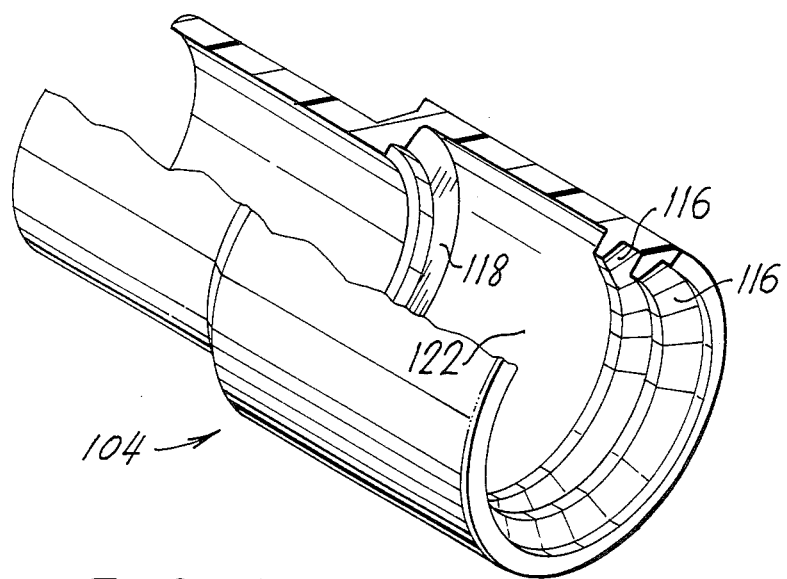
FIG. 5 is a partially cut-away perspective drawing of a swivel cuff such as may provide swivelable coupling in combination with the vacuum hose of FIG. 4.
Figure 6:
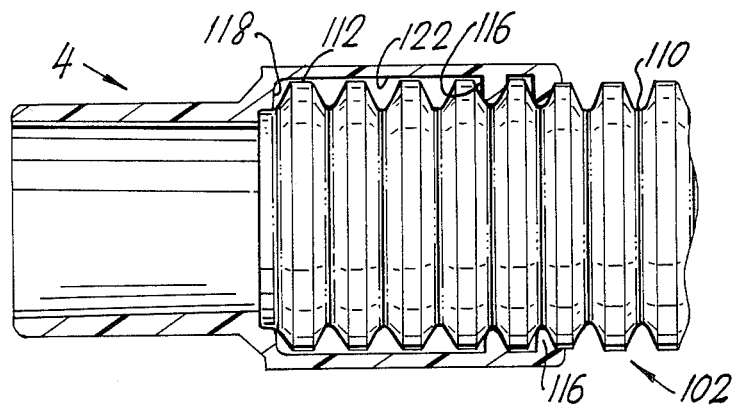
FIG. 6 is a partial cross-sectional view of the hose of FIG. 4 in seating connection with the swivel cuff of FIG. 5.

A preferred embodiment according to the instant invention is illustrated in FIGS. 4, 5, and 6. In FIG. 5, cuff 104 is provided with one or more (two shown) annular rings 116 which are adapted to directly engage the indentations 110 between convolutions 112 of the corrugated hose pattern of corrugated blow-molded hose 102 (see FIG. 4). A second annular ring 118 may be provided about the inner circumference of the cuff at a distance from annular ring 116 defining a seating portion 122 therebetween. The diameter of seating portion 122 of cuff 104 is sized such that the corrugated blow-molded hose 102 will seat directly in the cuff (see FIG. 6).

Advantageously, the cuff arrangement herein described provides for a secure fastening between cuff 104 and hose 102. As preferably embodied, internal annular rings 116 will pass several (e.g., 5) convolutions 112 of the corrugated hose pattern to be fully disassembled.

The lack of a seal between hose 102 and cuff 104 enables the corresponding plastic surfaces that face each other during rotation of the cuff to be continuously lubricated by the pool water. This lubrication adds considerably to the swivelability of the hose coupling.

Additionally, it will be appreciated that the cuff arrangement according to the instant invention has the advantage that it obviates the need for a cylindrical end portion on the blow-molded hose. The invention thus provides for low tooling cost while maintaining the inherently low production and assembly cost of the previously described embodiments.

Figure 7:
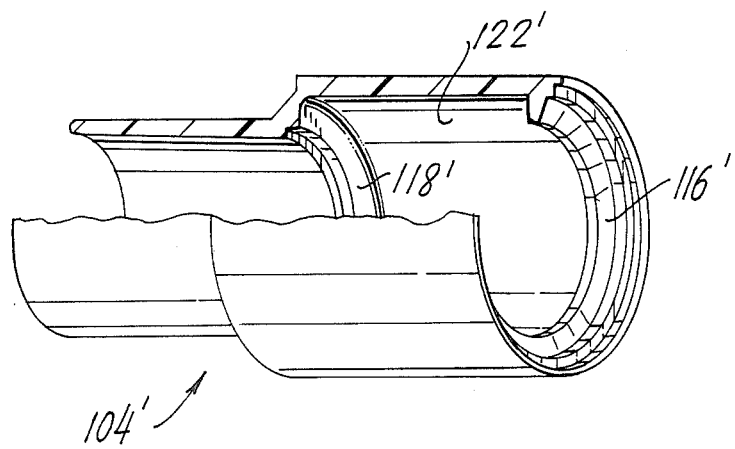
FIG. 7 is a partially cut-away perspective drawing of an alternative embodiment of a swivel cuff wherein only one retaining ring is provided about the entrance to the cuff.

Another embodiment of the cuff according to the invention is shown in FIG. 7. In this embodiment, cuff 104' is provided with only one annular ring 116' which is adapted to directly engage the indentations between the convolutions of the hose. It will be appreciated that this embodiment will also provide a secure fastening of the cuff to the hose.

Figure 8:
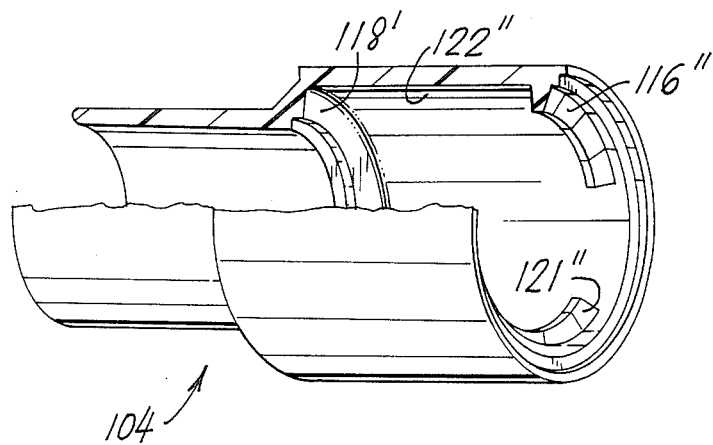
FIG. 8 is a partially cut-away perspective drawing of a swivel cuff wherein the retaining ring about the entrance to the cuff is interrupted, forming lugs thereabout, in accordance with one further embodiment of the invention.

A further embodiment of the invention is shown in FIG. 8, wherein the first annular ring 116" provided about the hose entrance to the seating portion 122" of the cuff 104" is an interrupted ring comprising multiple lugs 121" yet retaining the swivelable characteristics of the aforementioned embodiments.

Thus, the instant invention provides an inexpensive, lightweight and crush-resistant vacuum hose and swivel cuff coupling for use in aquatic environments such as in a swimming pool. More particularly, by taking advantage of widely known extrusion blow-molding techniques, and eliminating the need to weld sealing members onto the hose end, the instant invention provides a simple and effective swivel cuff coupling which is not only less expensive than previously known swivel cuffs and eliminates the failure points usually present at weld points within welded swivel cuff fittings but also will engage the corrugated hose pattern directly without the need of a special blown end on the hose.

It will, of course, be realized that although the instant invention has been described in great detail according to the embodiments and illustrations provided herein these illustrations and embodiment should not be deemed to in any way limit the spirit of the invention or the scope of the claims which follow.

What is claimed is:

1. A hose and swivel cuff, comprising, in combination:
  a flexible blow-molded hose having substantially uniform circumferential grooves and convolutions throughout the length thereof;
  a one-piece molded cuff which has a seating portion for receiving and adapted to coupled with an end portion of said hose, regardless of the point at which the hose is cut, and at least one rigid annular ring adapted to fit within one of said circumferentail grooves of said hose, said at least one annular ring being provided about the hose entrance to said seating portion of said cuff;
  wherein the inner diameter of said at least one annular ring is less than the outer diameter of said circumferential convolutions of said hose, the end portion of said hose is maintained within said seating portion by said at least one annular ring being engaged within one of said circumferential grooves such that said hose end is locked in the longitudinal direction within said cuff, and said hose portion is swivelably rotatable within said cuff, and water may seep around the outer circumference of said end portion and into said cuff.

2. The hose and swivel cuff combination of claim 1 wherein said cuff includes a second annular ring spaced a distance from said first annular ring, the area between said first and second annular ring retaining at least one corrugation of said hose end portion.

3. The hose and swivel cuff combination of claim 2, wherein said first annular ring is an interrupted ring.

* * * * *